United States Patent
Tang et al.

(10) Patent No.: US 8,452,059 B2
(45) Date of Patent: May 28, 2013

(54) SYSTEMS AND METHODS FOR PERFORMING IMAGE CLUSTERING

(75) Inventors: Shih-Min Tang, Tainan County (TW); Chi-Ming Lee, Xindian (TW)

(73) Assignee: Cyberlink Corp., Shindian, Taipei (TW)

( * ) Notice: Subject to any disclaimer, the term of this patent is extended or adjusted under 35 U.S.C. 154(b) by 0 days.

(21) Appl. No.: 13/476,101

(22) Filed: May 21, 2012

(65) Prior Publication Data

US 2012/0230593 A1    Sep. 13, 2012

Related U.S. Application Data

(62) Division of application No. 12/237,706, filed on Sep. 25, 2008, now Pat. No. 8,208,695.

(51) Int. Cl.
*G06K 9/62* (2006.01)

(52) U.S. Cl.
USPC .......................................... 382/118

(58) Field of Classification Search
None
See application file for complete search history.

(56) References Cited

U.S. PATENT DOCUMENTS

| | | | |
|---|---|---|---|
| 6,606,398 B2 | 8/2003 | Cooper | |
| 6,606,411 B1 | 8/2003 | Loui et al. | |
| 6,819,783 B2 | 11/2004 | Goldberg et al. | |
| 8,189,880 B2 * | 5/2012 | Wen et al. | 382/118 |
| 8,204,270 B2 * | 6/2012 | Tanigawa et al. | 382/100 |
| 2003/0210808 A1 | 11/2003 | Chen et al. | |
| 2006/0078201 A1 * | 4/2006 | Kim et al. | 382/181 |
| 2006/0245624 A1 | 11/2006 | Gallagher et al. | |
| 2006/0251292 A1 | 11/2006 | Gokturk et al. | |
| 2008/0085036 A1 * | 4/2008 | Fukushi | 382/118 |
| 2009/0169065 A1 | 7/2009 | Wang et al. | |

* cited by examiner

*Primary Examiner* — Brian P Werner
(74) *Attorney, Agent, or Firm* — McClure, Qualey & Rodack, LLP

(57) ABSTRACT

One embodiment, among others, is a method for clustering a plurality of images, wherein the plurality of images comprises faces of a plurality of individuals. The method comprises arranging the plurality of images associated with a plurality of individuals into a plurality of subgroups for each individual based on time stamps associated with the plurality of images, wherein the plurality of images are arranged according to increments of a time interval. The method further comprises determining whether adjacent subgroups are correlated and forming groups comprising correlated subgroups. Based on correlations between adjacent groups, the groups are associated with a particular individual.

16 Claims, 10 Drawing Sheets

SYSTEMS AND METHODS FOR PERFORMING IMAGE CLUSTERING

RELATED APPLICATIONS

This is a divisional application of patent application Ser. No. 12/237,706 filed on Sep. 25, 2008, the disclosure of which is incorporated herein by reference in its entirety.

TECHNICAL FIELD

The present disclosure generally relates to image management and more particularly relates to systems and methods for performing image clustering.

BACKGROUND

With the widespread use of digital cameras, many individuals turn to image management tools to archive and organize their digital photographs. Image management tools found on the market offer various features, including automatic image organization. The archived images may then later be viewed by the individual or published for others to view. Image management tools may also be used to search for a particular individual's photo(s) within a collection of photographs. Such applications may be useful when a user wants to identify all photos of a particular individual so that the user can post and tag pictures of that individual on a website, for example. Challenges may arise, however, when trying to automatically organize photos of individuals that span a long period of time such as a few years as one's appearance tends to change over time. While manually organizing photos is an alternative, this approach can be tedious and time-consuming.

SUMMARY

Briefly described, one embodiment, among others, is a method for clustering a plurality of images, wherein the plurality of images comprises faces of a plurality of individuals. The method comprises arranging the plurality of images associated with a plurality of individuals into at least two groups using facial clustering, wherein the first group is clustered based on a first temporal information comprising a first start time and first end time, and the second group is clustered based on a second temporal information comprising a second start time and second end time. In accordance with such embodiments, the second start time is between the first start time and the first end time. The method further comprises determining whether any of the at least two of groups include at least one overlapping image. In response to determining that any groups contain at least one overlapping image, the overlapping groups are associated with one individual.

Another embodiment is a method for clustering a plurality of images, wherein the plurality of images comprises faces of a plurality of individuals. The method comprises arranging the plurality of images associated with a plurality of individuals into a plurality of subgroups for each individual based on time stamps associated with the plurality of images, wherein the plurality of images are arranged according to increments of a time interval. The method further comprises determining whether adjacent subgroups are correlated and forming groups comprising correlated subgroups. Based on correlations between adjacent groups, the groups are associated with a particular individual.

Another embodiment includes a program stored on a computer readable medium for clustering images of individuals. The program comprises logic for arranging the plurality of images associated with a plurality of individuals into at least two groups using facial clustering, wherein the first group is clustered based on a first time interval and the second group is clustered based on a second time interval. The program further comprises logic for determining quantities of images associated with the first and second time interval and based on the image quantities, setting the first and second time interval. The program also comprises analysis logic for determining correlation between the at least two groups and logic for associating correlated groups with one individual based on whether the at least two groups are correlated.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
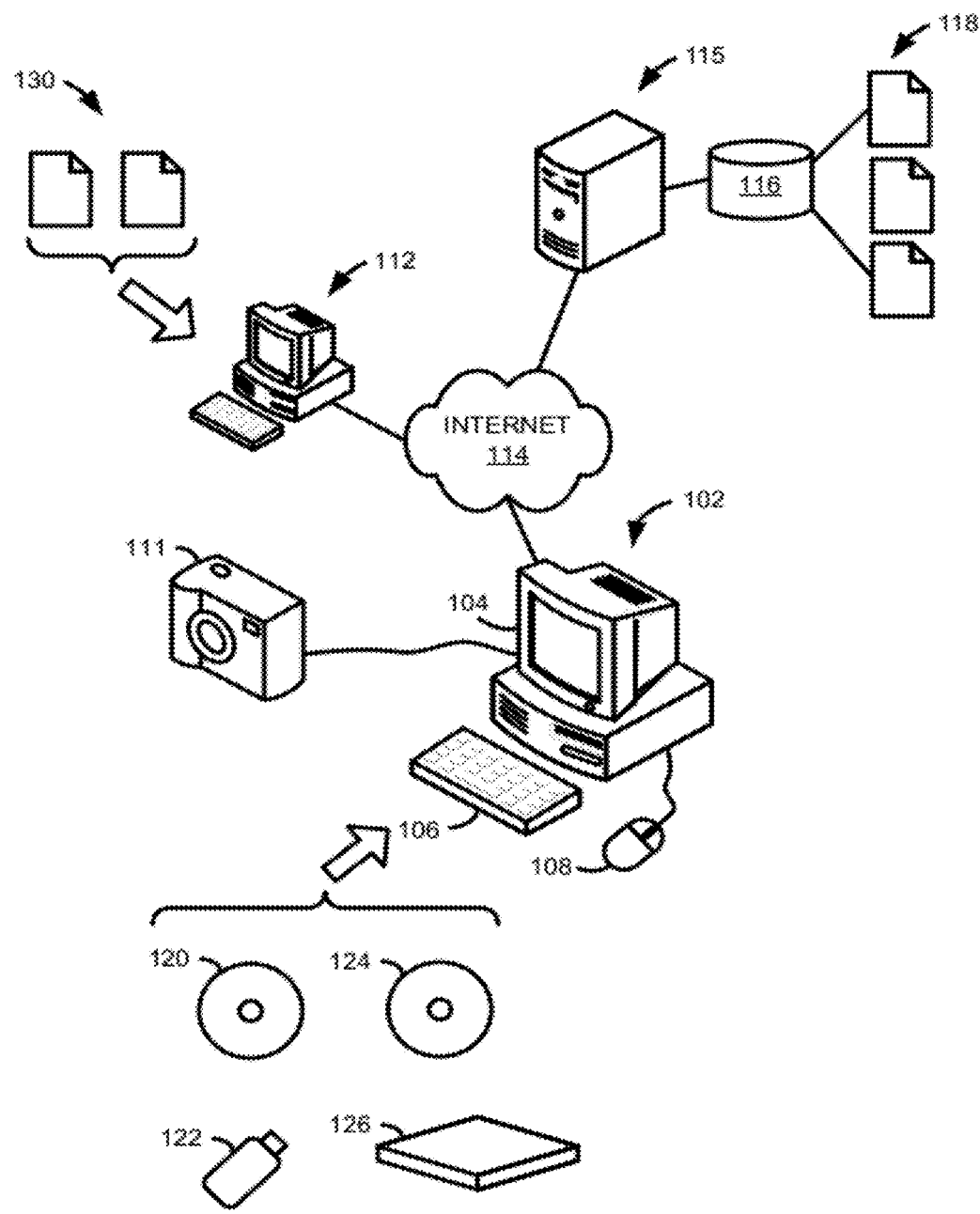
FIG. 1 depicts a top-level diagram of an apparatus for clustering images.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, image management tools are available on the market that offer such features as automatic image organization. However, one perceived shortcoming with using such tools on images of individuals is that an individual's appearance tends to change over the course of time. For example, an individual might undergo a number of hairstyle changes within the course of a year, making it difficult to cluster photographs of that individual in an automated fashion.

Various embodiments are described for performing facial image clustering. In particular, digital images or photographs of a particular individual are clustered or arranged together based on cluster analysis. Various embodiments for performing cluster analysis allow a user to identify all photographs of a particular individual from a collection of digital photographs taken over time. The collection may comprise photographs or images of a wide number of individuals. Because an individual's appearance generally tends to change gradually, photographs taken close together in time tend to exhibit similarities in the individuals' appearance. Embodiments are described for dividing photographs of individuals into groups and subgroups based on predetermined time windows. Within each subgroup, facial image clustering is performed wherein images falling within the particular time window defined by the subgroup are analyzed. In this regard, cluster analysis is performed on a subgroup-by-subgroup basis. The generated subgroups are then analyzed.

For some embodiments, if two particular subgroups exhibit a high degree of correlation between them, the two subgroups of photographs are linked together, and the combined subgroups are associated with the particular individual depicted in the subgroups. subgroups that are correlated are then linked together to form groups. In accordance with some embodiments, an overlapping cluster scheme is utilized whereby groups are formed with overlapping subgroups. In accordance with other embodiments, a non-overlapping cluster scheme is utilized where subgroups are correlated with adjacent subgroups in a repetitive fashion such that a first subgroup is eventually correlated with a last subgroup and whereby the images in each of the subgroups are associated with a particular individual.

Reference is made to FIG. 1, which depicts a top-level diagram of an apparatus for clustering images. For some embodiments, a system for clustering images or photographs of individuals may be incorporated in an image analyzer 102, which may be, for example, a computer workstation or a laptop. The image analyzer 102 may include a display 104 and input devices such as a keyboard 106 and a mouse 108. Furthermore, the image analyzer 102 may be configured to provide a user interface, which a user utilizes to select images or photographs to cluster. The user interface may also allow a user to specify a particular individual on which the various embodiments of cluster analysis described herein are performed. For some embodiments, the user may perform cluster analysis for more than one individual.

As illustrated in FIG. 1, the image analyzer 102 may be further configured to read and process photographs or images from a wide range of sources. For example, the image analyzer 102 may be configured to read digital images directly from a digital camera 111. As other non-limiting examples, the image analyzer 102 may also read digital images stored on a compact disc (CD) 120, DVD 124, USB flash drive 122, and an external hard drive 126. Digital images 130 may be stored locally on the image analyzer 102 or remotely on another system 112 such as a computer desktop. Digital images 118 may also be stored in a database 116 on a server 115 maintained by a media content provider, for example. Emphasis should be placed on the fact that the images to be processed may be stored locally on the image analyzer 102 or stored in a distributed fashion in remote locations, or a combination of both.

The image analyzer 102 is configured to receive the digital images, perform cluster analysis, and output the results for a user to view. Using the image analyzer 102, the user may select one or more sources of digital content. In some embodiments, the image analyzer 102 may be further coupled to a network, such as the Internet 114. For such embodiments, media content may be downloaded from another computing device 112 or server 115 also coupled to the Internet 114. The user may then utilize the image analyzer 102 to identify an individual on which cluster analysis is based on. In particular, based on specified individual, the image analyzer 102 analyzes the received digital images and clusters those of the selected individual. The image analyzer 102 clusters the images regardless of when the images or photographs were taken.

Figure 2:
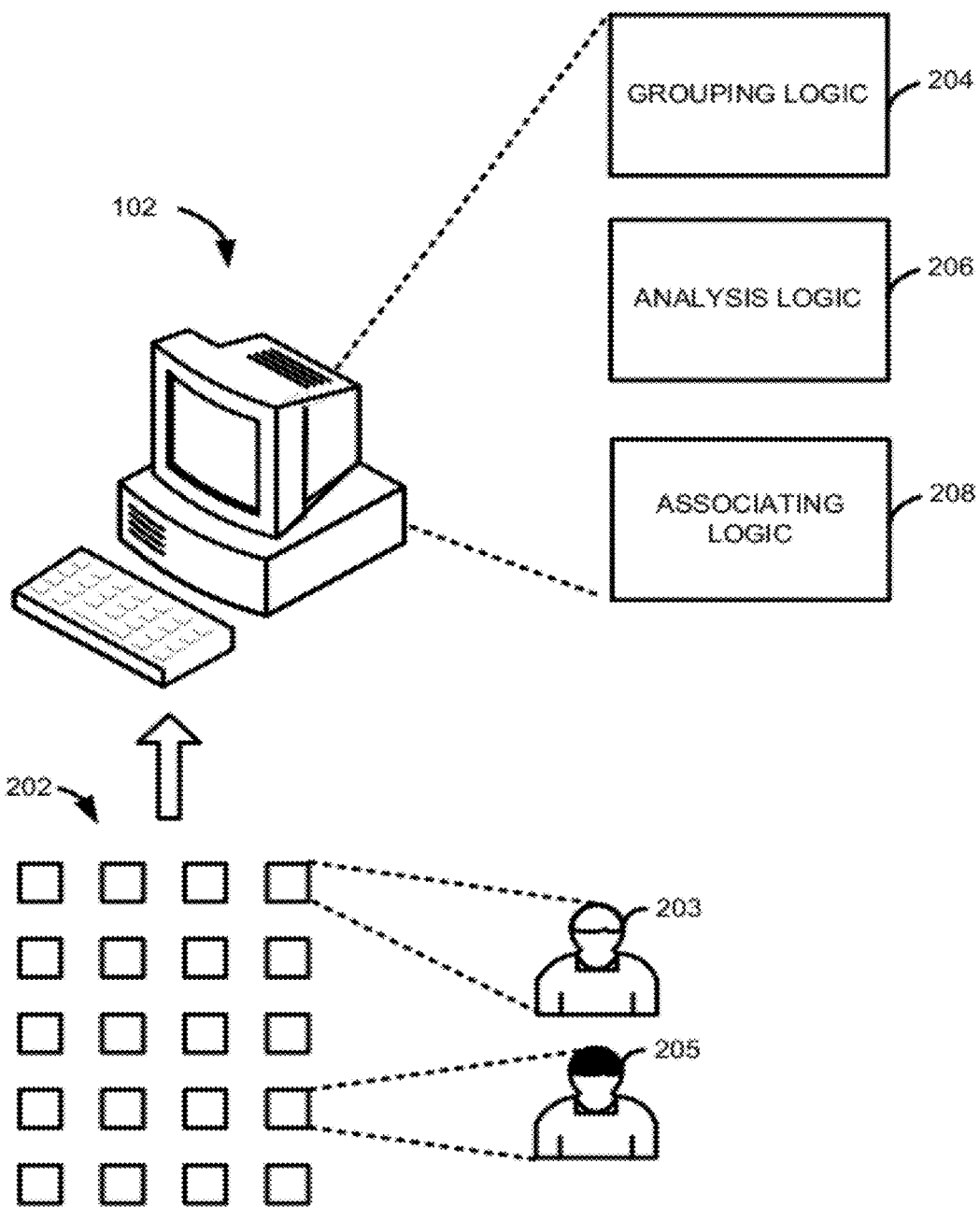
FIG. 2 is a block diagram illustrating various components of the apparatus in FIG. 1.

Reference is now made to FIG. 2, which is a block diagram illustrating various components of the apparatus in FIG. 1. The image analyzer 102 is generally configured to read a plurality of images 202. As described above, the images 202 may be stored locally on the image analyzer 102 itself or remotely, or a combination of both. The plurality of images 202 may contain images of one or more individuals 203, 205. The image analyzer 102 includes grouping logic 204 configured to parse the received images and arrange the received images into groups and subgroups. Generally, groups refer to clusters of images that are arranged together based on a selected individual and based on a first time interval. For example, all images of an individual (e.g., John) taken over the year spanning 2006 to 2007 are manually arranged together to form a group by the user. It should be noted, however, that the images may also be arranged into groups in an automated fashion by the image analyzer (102). By way of illustration, an individual returning from a trip creates a photo album which contains album associated with the trip. The image analyzer (102) analyzes the photos within the photo album in addition to photos from other archives and performs facial clustering for various time intervals. For example, photos of a particular individual taken over the course of the last year are arranged together into a group.

The groups may be further partitioned into subgroups, which refer to images arranged together based on a second time interval (e.g., 4 months), which is generally smaller than the first time interval. Thus, images of John taken from Jan. 1, 2006 to Apr. 30, 2006 may form one subgroup, while images of John taken from May 1, 2006 to Aug. 31, 2006 may form a second subgroup within the group spanning 2006 to 2007. It should be noted that the embodiment above generally corresponds to a non-overlapping method for facial clustering. In accordance with other embodiments for performing an overlapping method for facial clustering, the grouping logic 204 may also be configured to cluster images in such a way that multiple groups are generated due recognition of different faces.

The analysis logic 206 analyzes the images in the partitioned groups and subgroups to determine if any groups/subgroups are correlated. The analysis logic 206 may determine whether two groups/subgroups are correlated based on various factors, including facial characteristics and time-related information. Another factor comprises features or characteristics relating to clothing worn by the individuals. As a non-limiting example, two subgroups containing photographs that were taken close in time and that exhibit similar facial characteristics (or where the individuals are wearing very similar clothing) can be considered as correlated subgroups. The associating logic 208 then associates, based on the results derived by the analysis logic 206, a particular set of groups/subgroups to a particular individual.

Figure 3:
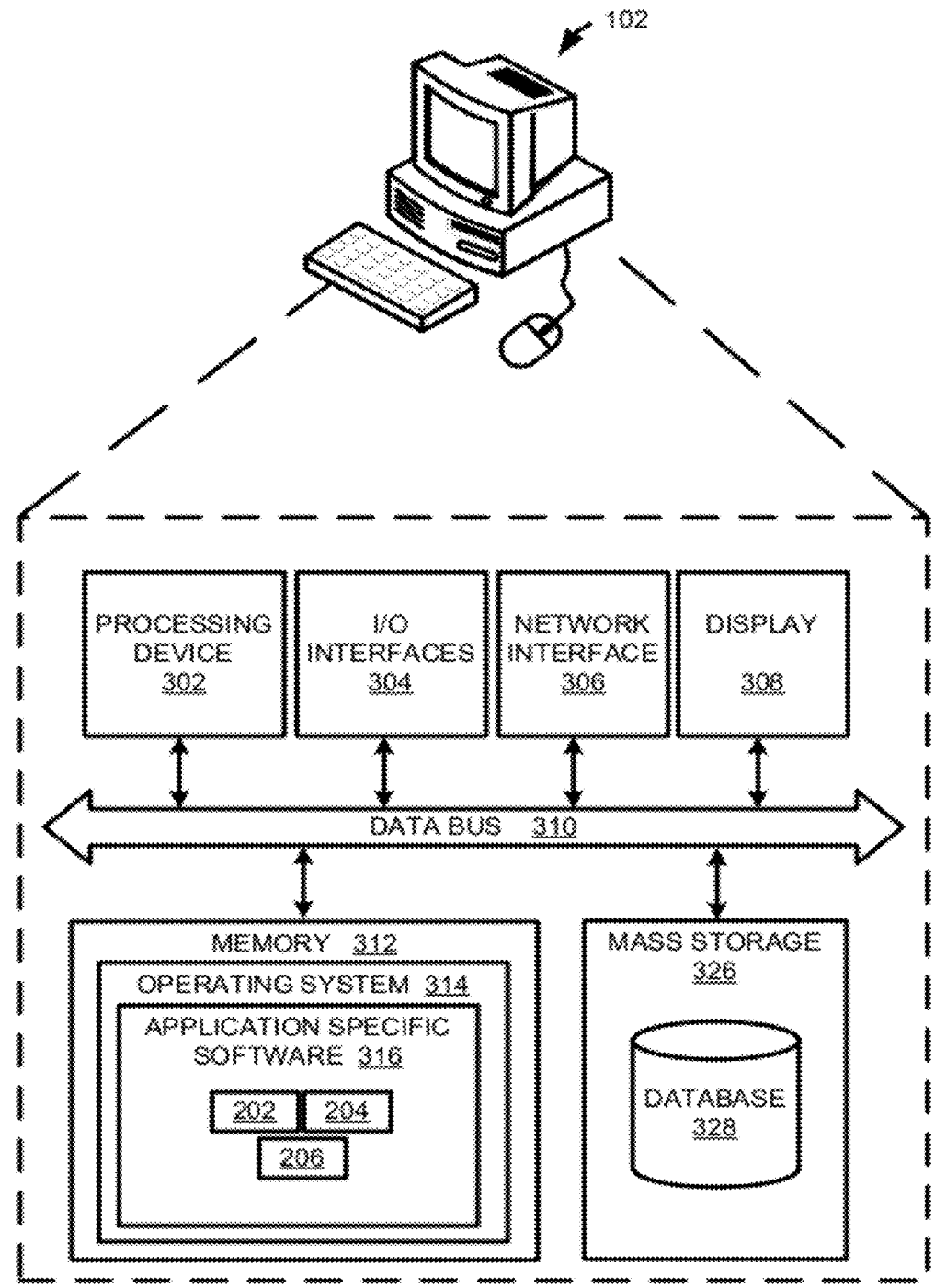
FIG. 3 illustrates an embodiment of the image analyzer shown in FIG. 1 for executing the various components shown in FIG. 2.

Reference is now made to FIG. 3, which illustrates an embodiment of the image analyzer shown in FIG. 1 for executing the various components shown in FIG. 2. Generally speaking, the image analyzer 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, image analyzer 102 can, for instance, comprise memory 312, a processing device 302, a number of input/output interfaces 304, a network interface 306, a display 308, and mass storage 326, wherein each of these devices are connected across a data bus 310.

Processing device 302 can include any custom made or commercially available processor, a central processing unit (CPU) or an auxiliary processor among several processors associated with the image analyzer 102, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 stored on a computer readable medium for execution by the processing device 302 and may include any of the modules 202, 206, 208 described with respect to FIG. 2. One of ordinary skill in the art will appreciate that the memory 312 can, and typically will, comprise other components which have been omitted for purposes of brevity.

Input/output interfaces 304 provide any number of interfaces for the input and output of data. For example, where the image analyzer 102 comprises a personal computer, these components may interface with user input device 304, which may be a keyboard or a mouse, as shown in FIG. 1. Where the image analyzer 102 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image analyzer 102 may further comprise mass storage 326. For some embodiments, the mass storage 326 may include a database 328 to store and manage data. Such data may comprise, for example, editing files which specify special effects for a particular movie title.

Figure 4:
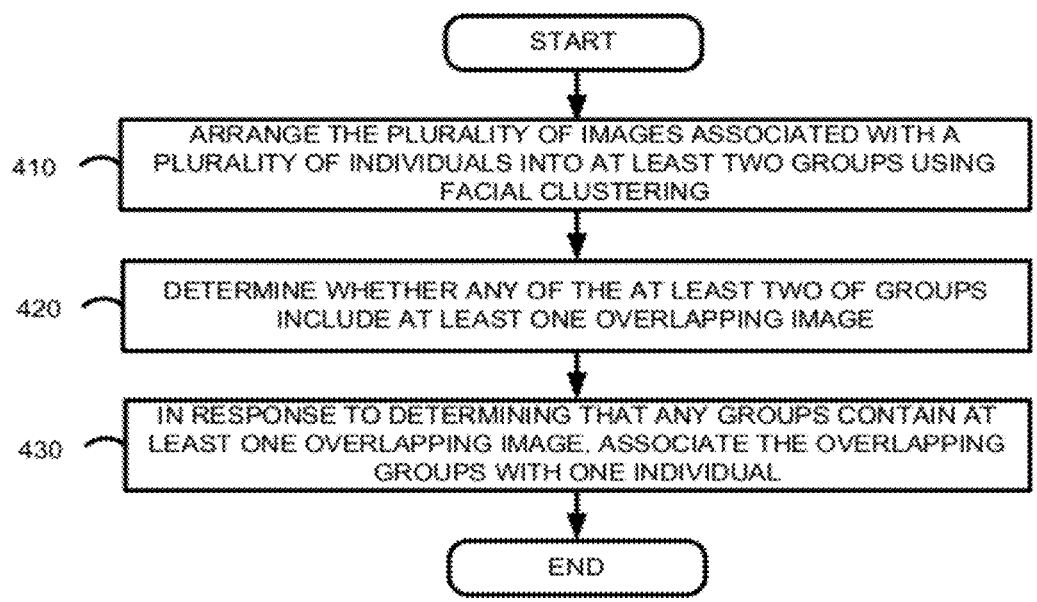
FIG. 4 depicts an embodiment of a method for clustering images using the apparatus depicted in FIGS. 1-3.

Reference is made to FIG. 4, which depicts an embodiment of a method for clustering images using the apparatus depicted in FIGS. 1-3. In particular, FIG. 4 depicts an overlapping method approach to clustering images. Block 410 begins by arranging the plurality of images associated with a plurality of individuals into at least two groups using facial clustering. The first group is clustered based on a first temporal information that comprises a first start time and first end time. Likewise, the second group is clustered based on a second temporal information that comprises a second start time and second end time. For such embodiments, the second start time is between the first start time and the first end time such that the time span of the first temporal information overlaps with that of the second temporal information. The first and second temporal information may span one year, for example. For some embodiments, the time interval defined by the temporal information may be based on the quantity of images being processed. For example, a relatively low quantity of images may require a longer time interval in which to process the images as fewer images are available. Conversely, a large quantity of images may allow use of a shorter time interval to be incorporated. Thus, in accordance with some embodiments, the time interval may be dynamic in nature to account for the fact that the digital photos might not be uniformly distributed with respect to time. For such embodiments, the time interval is based on the image quantity and is decreased in response to an increase in the quantity of images. Such embodiments take advantage of the fact that there are more samples (i.e., images) available to process.

Block 420 continues by determining whether any of the at least two of groups include at least one overlapping image. In response to determining that any groups contain at least one overlapping image, the overlapping groups are associated with one individual (block 430). For some embodiments, associating the overlapping groups with one individual comprises associating groups based on the degree in which the overlapping groups are correlated. The degree of correlation may be based, for example, on the following: degree of similarity in facial features, degree of similarity in features of the clothing worn by the individuals, and degree of temporal correlation.

Figure 5:
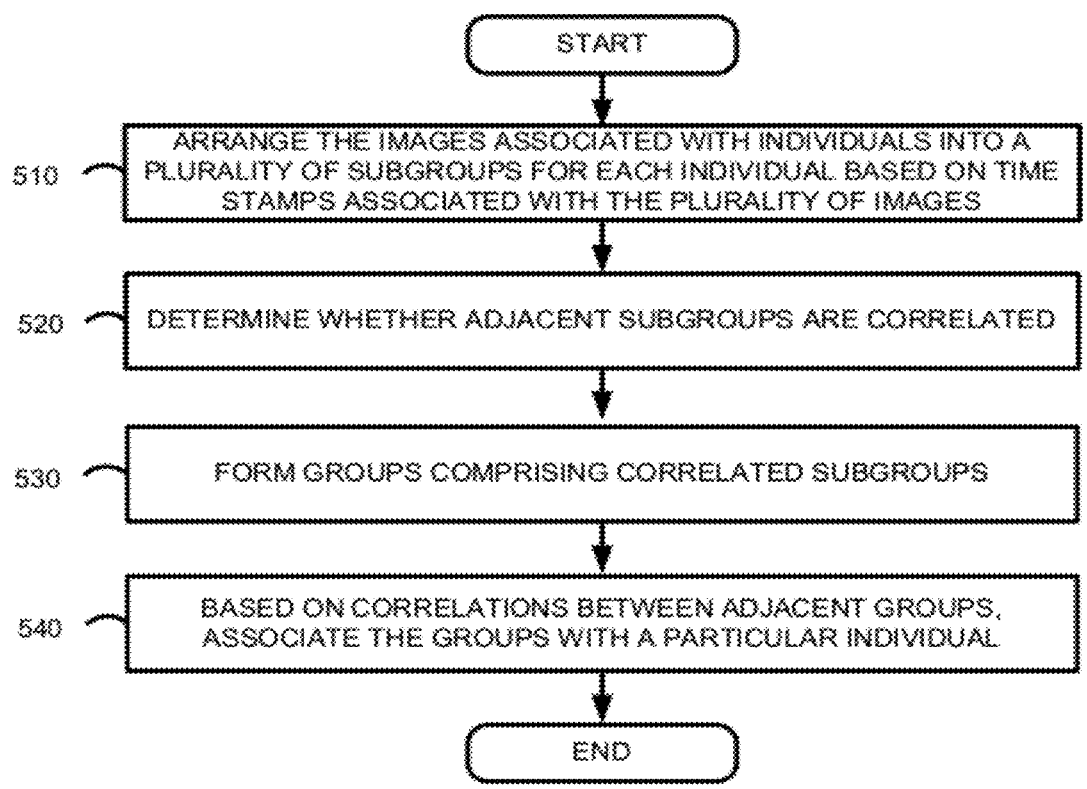
FIG. 5 depicts an alternative embodiment of a method for clustering images using the apparatus depicted in FIGS. 1-3.

Reference is made to FIG. 5, which depicts an alternative embodiment of a method for clustering images using the apparatus depicted in FIGS. 1-3. In particular, FIG. 5 depicts a non-overlapping method approach to clustering images. Beginning in block 510, images of various individuals are arranged into subgroups for each individual based on time stamps associated with the images. The images are arranged according to increments of a time interval. As an example, subgroups may be formed in 4-month increments. As described earlier, the time interval may be based on the quantity of images being processed. For example, a small quantity of images may require a longer time interval. Conversely, a large quantity of images may allow use of a shorter time interval to be incorporated. As a non-limiting example of how the subgroups are defined or arranged based on a time interval, a first subgroup (subgroup A) may span Jan. 1, 2007 to Apr. 30, 2007. A second subgroup (subgroup B) may span the next 4 months—May 1, 2007 to Aug. 31, 2007. A third subgroup (subgroup C) may span the succeeding 4 months after that—Sep. 1, 2007 to Dec. 31, 2007. As the quantity of images increases, however, the time interval decreases.

In block 520, a determination is made on whether adjacent subgroups are correlated. Referring back to the example above, subgroup A is compared to its adjacent subgroup, subgroup B. subgroup B is compared to subgroup C and so on. A determination is made on whether subgroup A and subgroup B are correlated. Likewise, a determination is made on whether subgroup B and subgroup C are correlated. As described earlier, the determination of whether two groups/subgroups are correlated may be based on such criteria as time stamp information and similarities in facial characteristics within the digital images. The determination may also be based on characteristics associated with the clothing worn by the individuals. As a non-limiting example, subgroup A may contain a large distribution of digital images taken from Apr. 27-29, 2007. Subgroup B may contain a large distribution of digital images taken from May 1-3, 2007. Based on the proximity in time of the images, a correlation exists between subgroups A and B. In block 530, groups are then formed from correlating subgroups. In block 540, groups that are correlated are associated with a particular individual.

Figure 6:
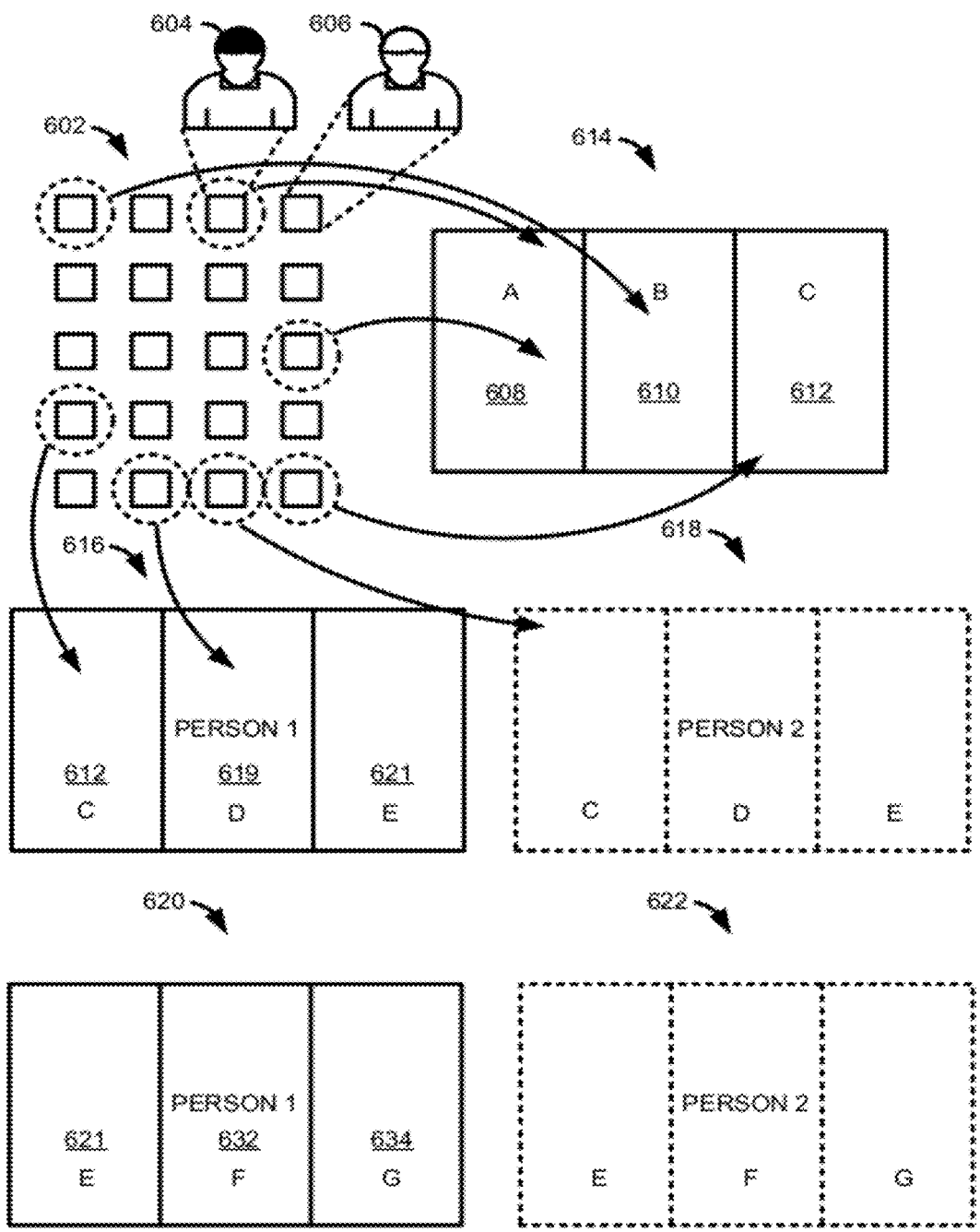
FIGS. 6-7 illustrate the steps shown in the embodiment in FIG. 4.
Figure 7:
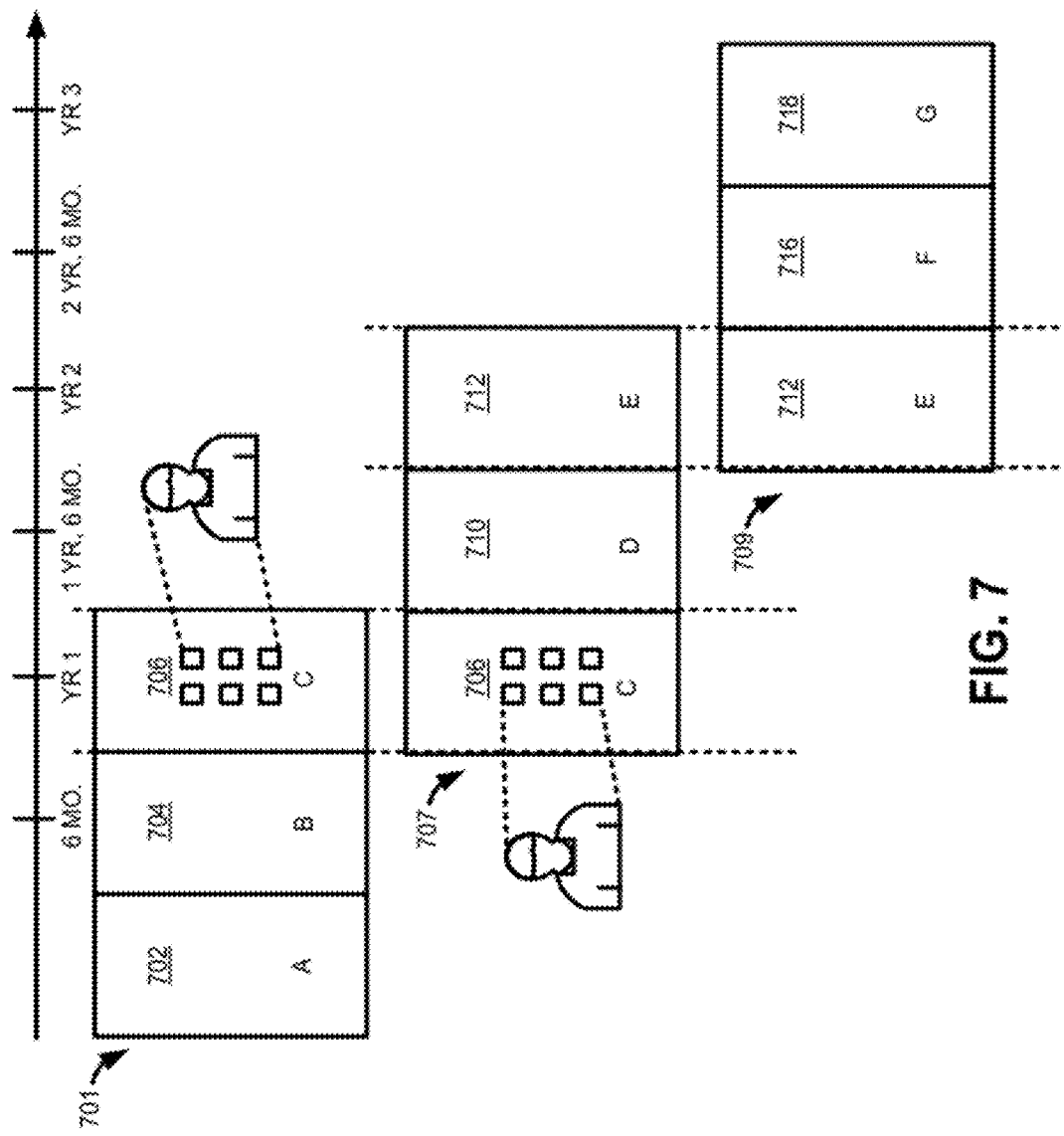

Reference is made to FIGS. 6-7, which illustrate the steps shown in the embodiment in FIG. 4. FIG. 6 shows a collection of photographs or digital images 602 which contain images of various individuals 604, 606. As described earlier, the images 602 are arranged into various groups 614, 616, 618, 620, 622 based on temporal information associated with each of the images 602. The temporal information may, for example, comprise time stamps associated with each of the digital images 602. As shown in the non-limiting example in FIG. 6, the groups 614, 616, 618, 620, 622 may each span one year. Thus the first group 614 may span Year 1, while the second group 616 may span Year 2. As depicted in FIG. 6, the number of groups will depend on the number of individuals 604, 606 within the collection of digital images 602. Thus, in the example shown, Year 2 may include two groups 616, 618 for the two individuals 604, 606. Year 3 includes two groups 620, 622. It should be noted, however, that in accordance with some embodiments, a particular individual may be selected. Accordingly, groups are generated for that particular individual. Each of the groups 614, 616, 618, 620, 622 may be further partitioned into subgroups. As shown in FIG. 6, the first group 614 is partitioned into three subgroups (A, B, C) 608, 610, 612. The labels (A, B, C) correspond to different time windows. In the second group 616 for Person 1, the group comprises subgroups (C, D, E) 617, 619, 621. It should be noted that the second group 616 also contains subgroup C 612 such that the first group 614 and the second group 616 overlaps with respect to time. Likewise, the second group 616 and the third group 620 each include subgroup E 621. In this regard, the groups overlap with each other.

FIG. 7 provides an illustration of overlapping groups. In accordance with embodiments for performing overlapping cluster analysis, the first group 701 comprises subgroups (A, B, C) 702, 704, 706. The second group 707 comprises subgroups (C, D, E) 706, 710, 712, and the third group 709 comprises subgroups (E, F, G) 712, 716, 718. Based on the overlapping groups 701, 707, 709, digital images of individuals can be identified and correlated over a long period of time. In the non-limiting example shown, photographs that fall within the window defined by subgroup A 702 may be clustered together to form subgroup A 702. As described earlier, photographs taken close together in time tend to exhibit similarities in the individual's appearance. Accordingly, the clustering of photos/images into subgroup A can be performed with high reliability as the photos in this subgroup were generated close in time.

Once the subgroups A-G 702, 704, 706, 710, 712, 716, 718 are formed, the subgroups are linked together to form groups 701, 707, 709 based on time information and based on how close the subgroups correlate with each other. For example, subgroups A 702 and B 704 may be correlated based on similarities in facial characteristics and thus linked together. The images in subgroup C 706 may exhibit facial characteristics similar to those in subgroup B 704 and thus be linked to subgroup B. Accordingly, subgroups A 702, B 704, and C 706 are linked together to form the first group 701. Furthermore, the images within subgroups (A, B, C) 702, 704 706 are all associated with same individual. The same process is performed to construct the second group 707 and the third group 709. Because of the overlapping subgroups between the three groups 701, 707, 709, the three groups 701, 707, 709 can be merged together and associated with the same individual such that photos/images spanning a long period of time can be reliably identified and grouped together.

Figure 8:
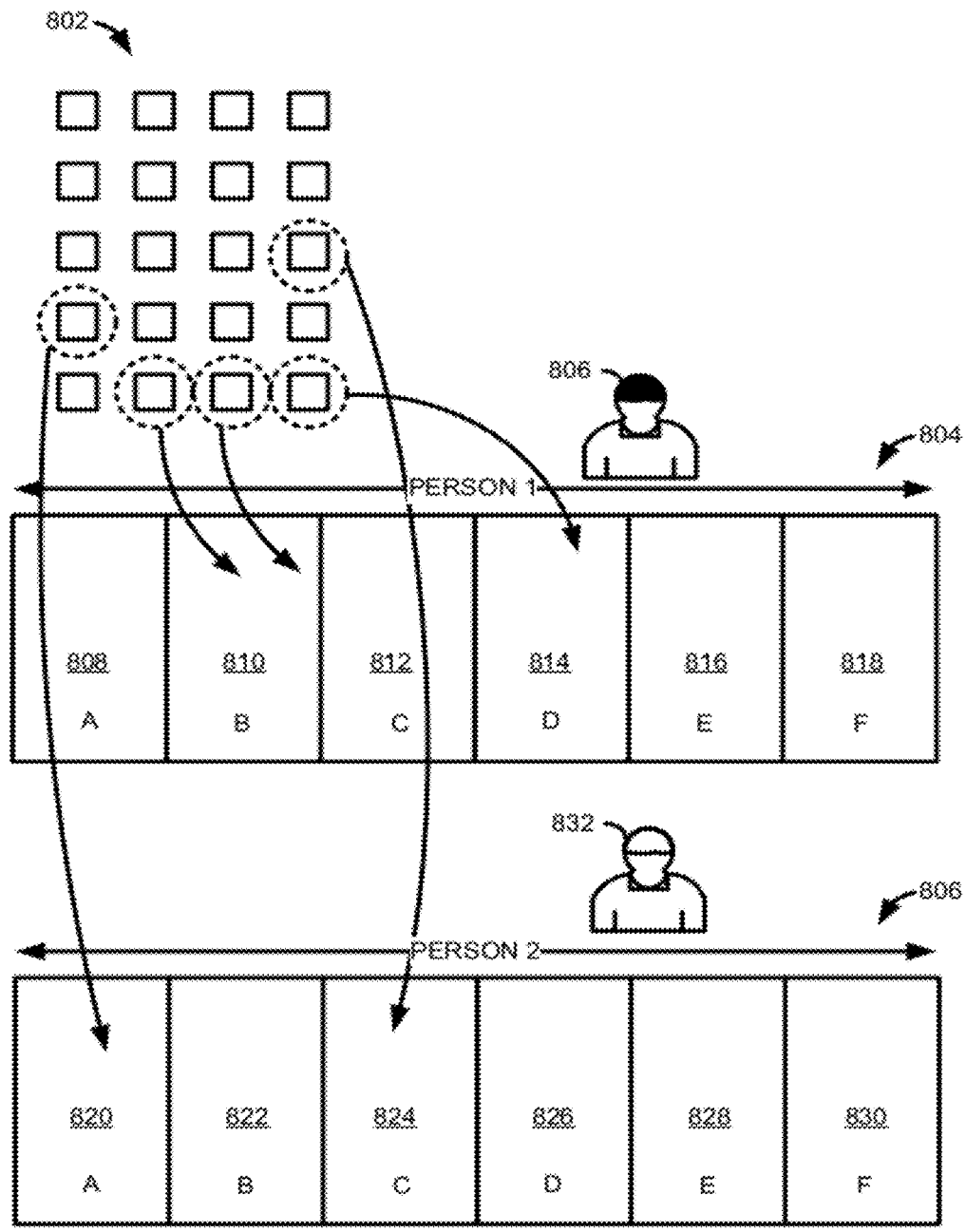
FIGS. 8-9A, B illustrate the steps shown in the embodiment in FIG. 5.
Figure 9A:
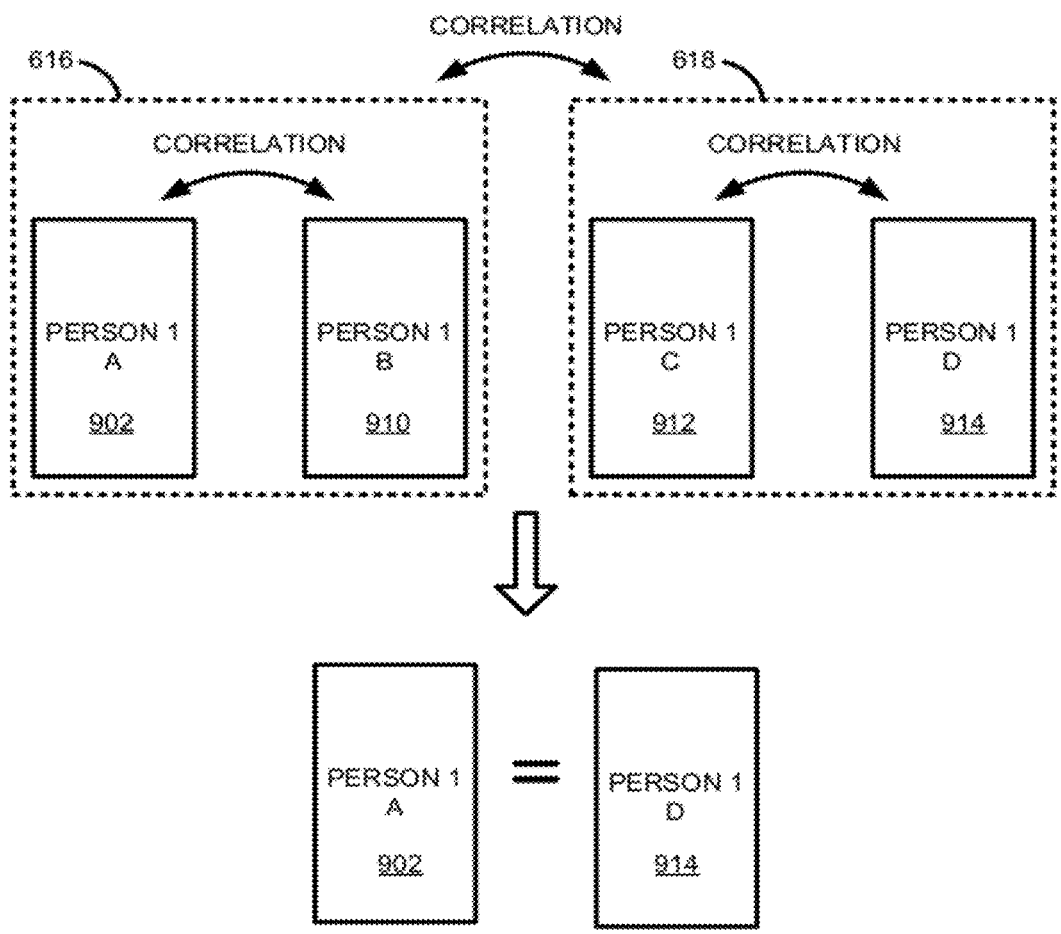

Reference is made to FIGS. 8-9A, B, which illustrate the steps shown in the embodiment in FIG. 5. In accordance with embodiments for performing non-overlapping cluster analysis, various subgroups are formed. In particular, subgroups A-F 808, 810, 812, 814, 816, 818 are formed based on a particular time interval for the first individual 806. The subgroups 808, 810, 812, 814, 816, 818 are formed based on cluster analysis performed for each of the corresponding windows of time. For example, for subgroup A 808, cluster analysis is performed to identify images of a particular individual 806. The images of the individual 806 are then grouped together to form subgroup A 808 based on time stamps associated with each of the images. For some embodiments, the time interval may be 4 months.

In the non-limiting example shown, the collection of images 802 includes a second individual 832. Accordingly, cluster analysis is performed for this individual 832 and corresponding subgroups (A-F) 820, 822, 824, 826, 828, 830 are formed. In accordance with some embodiments, cluster analysis begins by determining whether subgroup A 808 is correlated with its adjacent subgroup (subgroup B 810). If the two subgroups 808, 810 are correlated, then the two are linked together. Next, subgroup C 812 is compared with subgroup D 814 to determine whether there is any correlation between these two subgroups 812, 814. If there is some degree of correlation between the two, then they are linked together.

Subgroups A 808 and B 810, which form one group, are then compared to subgroups C 812, and D 814, respectively. Subgroups C 812 and D 814 are correlated and may form another group. It should be note that this is an optional step. Subgroup B 810 is then compared with subgroup C 812. If the two groups are correlated, then the two groups are linked together. This continues in a progressive fashion. If subgroup E 816 is correlated with subgroup F 818, then the two subgroups 816, 818 are linked together. These two subgroups 816, 818 are then compared to subgroups C 812 and D 814, respectively. For example, subgroup D 814 is compared with subgroup E 816. If the group formed by subgroups E 816 and F 818 correlate with the group formed by subgroups C 812 and D 814, then the groups are linked together. Accordingly, subgroup A 808 is eventually linked to subgroup F 818. The steps above are illustrated in FIG. 9A. subgroups A 902 and B 910 are compared, while subgroups C 912 and D 914 are compared. The groups 616, 618 formed by these subgroups are linked together is the subgroups 902, 910, 912, 914 are correlated. subgroup A 902 can thus be correlated with subgroup D 914.

Figure 9B:
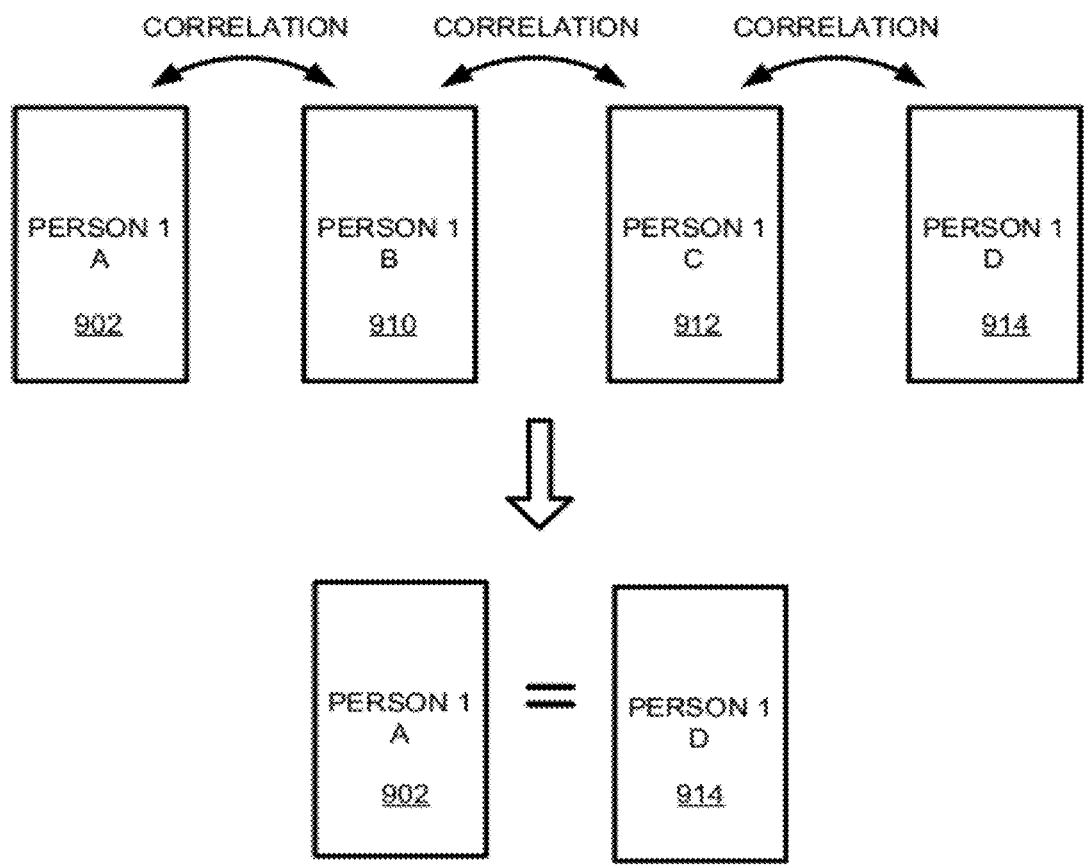

It should be emphasized that in accordance with other embodiments, comparisons are not limited to pairs of subgroups as individual subgroups can be directly compared. With reference to FIG. 9B, for example, subgroups A 902 is compared with subgroup B 910, which is compared with subgroup C 912. Subgroup C 912 is compared to subgroup D 914. If the subgroups 902, 910, 912, 914 are correlated, then a determination can be made that the individual depicted in the images contained in subgroup A 902 is the same as the individual depicted in the images contained in subgroup D 914. In this regard, the comparisons are not restricted to pairs of subgroups.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for clustering a plurality of images, wherein the plurality of images comprise faces of a plurality of individuals, the method comprising:
    arranging the plurality of images associated with a plurality of individuals into a plurality of subgroups for each individual based on time stamps associated with the plurality of images, wherein the plurality of images are arranged according to increments of a time interval;
    determining whether adjacent subgroups are correlated;
    forming groups comprising correlated subgroups;
    based on correlations between adjacent groups, associating the groups with a particular individual;
    determining a quantity of images within each subgroup; and
    based on the quantity of images in each subgroup, setting the time interval in which the plurality of images are arranged.

2. The method of claim 1, wherein arranging the plurality of images associated with a plurality of individuals into a plurality of groups comprises facial clustering.

3. The method of claim 1, wherein the time interval is 4 months.

4. The method of claim 1, wherein setting the time interval based on the image quantity comprises decreasing the time interval in which the plurality of images are arranged in response to detecting an increase in the quantity of images for each subgroup.

5. The method of claim 1, wherein determining whether adjacent groups are correlated comprises:
    progressively determining, with respect to time, whether adjacent subgroups are correlated.

6. The method of claim 1, wherein determining whether adjacent groups are correlated comprises determining a degree of similarity in facial features.

7. The method of claim 1, wherein determining whether adjacent groups are correlated comprises determining a degree of similarity of features in the clothing worn by the plurality of individuals.

8. The method of claim 1, wherein arranging the plurality of images associated with a plurality of individuals into a plurality of groups comprises arranging the plurality of images into non-overlapping groups.

9. A non-transitory program stored on a computer readable medium for clustering images of individuals, the program comprising:
    logic for arranging the plurality of images associated with a plurality of individuals into at least two groups using facial clustering, wherein the first group is clustered based on a first time interval and the second group is clustered based on a second time interval;
    logic for determining quantities of images associated with the first and second time interval and based on the image quantities, setting the first and second time interval;
    analysis logic for determining correlation between the at least two groups; and
    logic for associating correlated groups with one individual based on whether the at least two groups are correlated.

10. The program of claim 9 wherein the first time interval overlaps with the second time interval.

11. The program of claim 9, wherein analysis logic for determining correlation between the groups is configured to determine whether any of the plurality of groups contains overlapping images.

12. The program of claim 11, wherein analysis logic for determining correlation between the groups is configured to determine whether each of the at least two groups are correlated.

13. The program of claim 9, wherein analysis logic for determining correlation between the groups and between the subgroups is configured to determine whether adjacent subgroups are correlated.

14. The program of claim 9, wherein the first time interval is one year.

15. The method of claim 9, wherein the second time interval is 4 months.

16. The method of claim 9, wherein analysis logic is further configured to associate groups that are highly correlated with a particular individual.

* * * * *